April 14, 1931.   H. A. KNOX   1,800,221
ENDLESS TRACTION BELT FOR VEHICLES
Filed Feb. 20, 1928   2 Sheets-Sheet 1

Inventor
Harry A. Knox
By W. N. Roach
Attorney

April 14, 1931.  H. A. KNOX  1,800,221
ENDLESS TRACTION BELT FOR VEHICLES
Filed Feb. 20, 1928  2 Sheets-Sheet 2
Fig. 4.
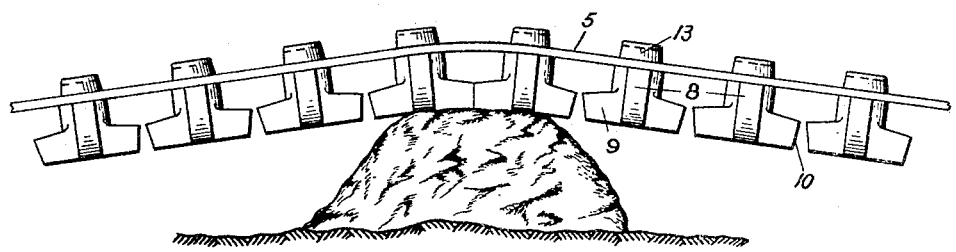
Fig. 5.
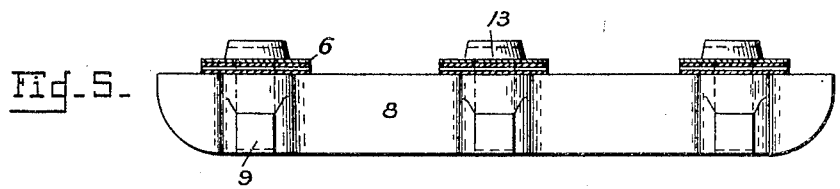
Fig. 6.
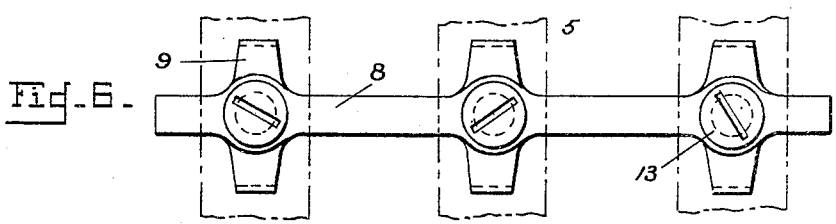
Fig. 8.
Fig. 7.
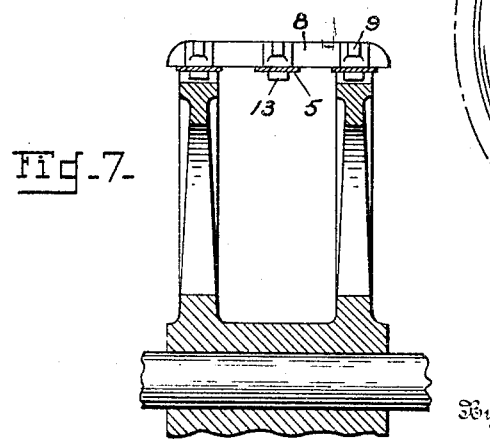
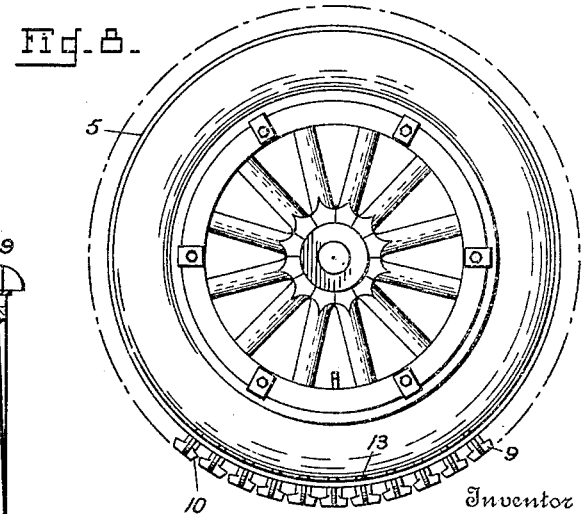
Inventor
Harry A. Knox
By W. N. Roach
Attorney Patented Apr. 14, 1931

1,800,221

UNITED STATES PATENT OFFICE

HARRY A. KNOX, OF DAVENPORT, IOWA

ENDLESS TRACTION BELT FOR VEHICLES

Application filed February 20, 1928. Serial No. 255,750.

(GRANTED UNDER THE ACT OF MARCH 3, 1883, AS AMENDED APRIL 30, 1928; 370 O. G. 757)

The invention described herein, if patented, may be manufactured and used by or for the Government for governmental purposes without the payment to me of any royalty thereon.

The subject of this invention is an endless traction belt for vehicles.

The track forming the subject matter of the present invention is an improvement in the tracks shown in my co-pending applications Ser. No. 730,497 filed August 8, 1924, and Serial No. 60,873, filed October 6, 1925, and is designed especially for use with a vehicle in which the track is mounted preferably under tension.

The invention is characterized by a novel arrangement of the grousers which in addition to having the object of holding a plurality of bands in spaced relation are designed to cooperate in confining the reverse flexure of the bands within their elastic limit and preferably within the limits of the normal flexure in passing around the sprocket and idler.

With the foregoing and other objects in view, my invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in accompanying drawings, wherein:

Fig. 4 is a view in side elevation illustrating the maximum flexure of the ground engaging portion of the track in an upward direction;

Fig. 5 is a sectional view on the line 5—5 of Fig. 2;

Fig. 6 is a plan view of one of the track grousers;

Fig. 7 is a detail sectional view illustrating a type of driving element for the track;

Fig. 8 is a view in elevation showing the traction belt on a single wheel.

Figure 1:
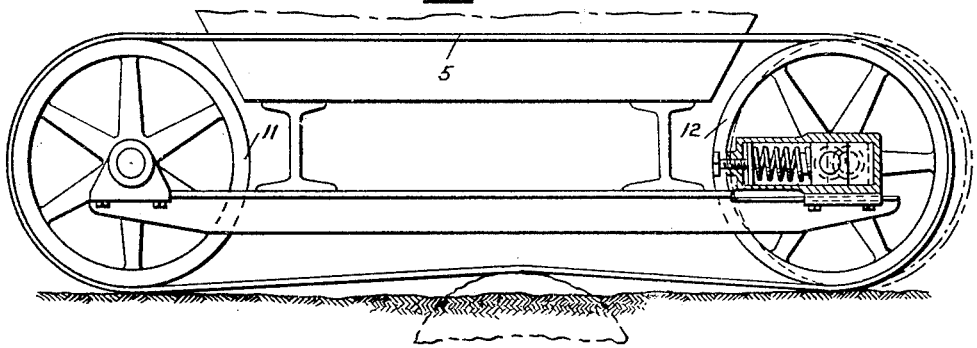
Fig. 1 is a schematic view in side elevation showing the action of the improved endless track.
Figure 2:
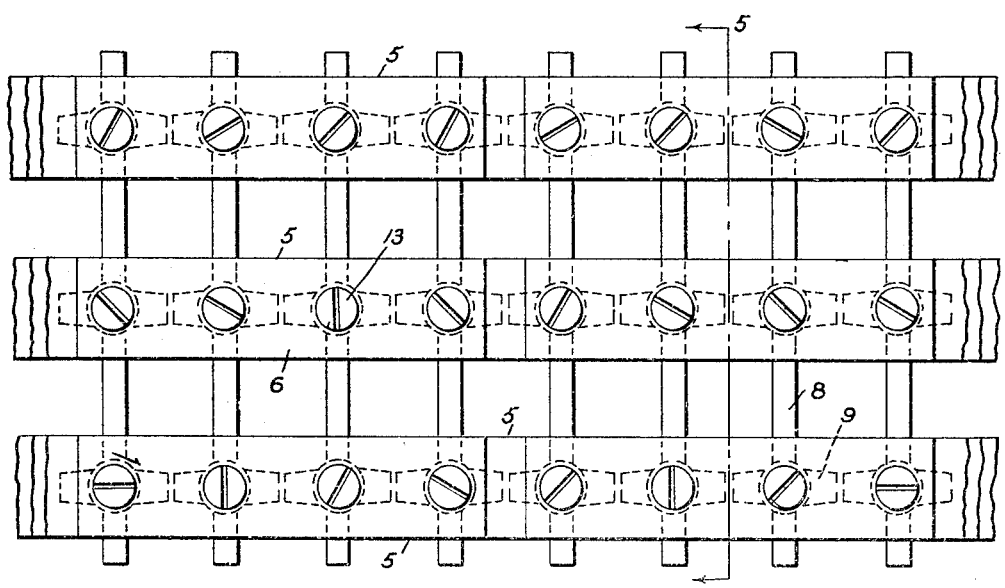
Fig. 2 is an inside plan view of a section of the track.
Figure 3:
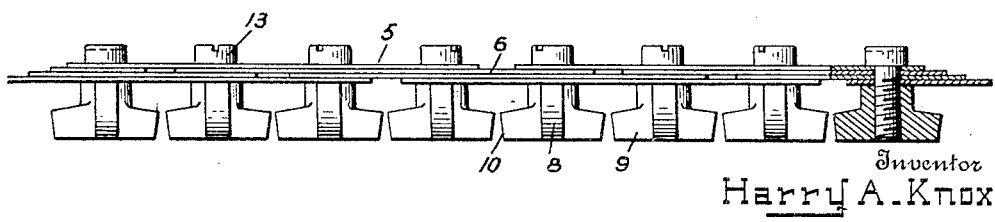
Fig. 3 is a view in side elevation, a portion in section.

Referring to the drawings by numerals of reference:

The endless track is made up of a plurality of bands 5 each consisting of overlapping plates 6, preferably of spring steel, arranged to provide at regular intervals a thickness of a greater number of plates, herein shown as four for the purpose of obtaining strength and a thickness of a lesser number of plates herein shown as three for providing flexibility. The plates are held together by means, for instance, of bolts 7 which also serve to retain grousers 8. The grousers span the entire group of bands 5 and in addition to providing transverse rigidity to the track, hold the bands in spaced relation to form an open type track which gives better traction in soft ground than a track which is closed and which tends more readily to clean itself.

The transverse grousers are formed with opposed arms 9 extending longitudinally of the bands 5 for the purpose of protecting the bands, forming cleats to prevent side-slipping and cooperating by means of their end faces 10 to confine reverse flexure of the bands to the curvature of the sprocket 11 and idler 12 which curvature is of course within the elastic limit of the metal of the bands.

In order to maintain the track under tension, while allowing for flexing of the track when passing over obstacles, the idler 12 is mounted in any well known manner so as to be capable of limited movement longitudinally of the vehicle.

The heads 13 of the bolts 7 serve as driving lugs for engagement with the sprocket. These heads may be rounded or tapered, if desired, so as to facilitate engagement with the sprocket. The sprocket preferably engages only the outer bands 5 to permit the track to more readily clear itself of mud and other accumulation.

Drive of the track may also be effected by a toothed sprocket engaging with the transverse grousers 8, as is conventional practice.

I claim:

1. An endless traction belt embodying spaced bands consisting of overlapping plates, grousers extending transversely across all of the bands, means for securing the plates and attaching grousers to the bands, and laterally spaced opposed arms on the grousers extending longitudinally of each band and having angled end faces arranged to cooperate in limiting flexure of the track.

2. In combination with a plurality of wheels an endless track encircling the wheels and embodying a plurality of bands consisting of overlapping plates, grousers secured to and extending transversely across the bands, laterally spaced outer arms extending longitudinally of each band, and having end faces arranged to cooperate in limiting reverse flexure of the bands within the curvature of the wheels.

3. An endless traction belt embodying spaced bands consisting of overlapping plates, grousers extending transversely across all of the bands, means for securing the plates and attaching grousers to the bands, said means projecting over the inside face of the band to provide driving means, and opposed arms on the grousers extending longitudinally of each band and having angled end faces arranged to cooperate in limiting flexure of the track.

4. A track for track laying vehicles embodying laterally spaced flexible bands, bars secured to the ground engaging side of the bands and spaced longitudinally thereof to allow free flexure of the bands between the bars, arms on the lower portions of the bars extending longitudinally of the bands and spaced from the bands at all times, the end faces of adjacent arms adapted to contact on reverse flexure of the track due to obstructions in the roadway to prevent undue flexure of the bands.

HARRY A. KNOX.